(12) United States Patent
Yang

(10) Patent No.: US 12,483,012 B2
(45) Date of Patent: Nov. 25, 2025

(54) HIGHLY EFFICIENT WIRE STRIPPING MACHINE

(71) Applicant: Yueqing Wending Electromechanical Co., Ltd, Wenzhou (CN)

(72) Inventor: Yunhai Yang, Wenzhou (CN)

(73) Assignee: Yueqing Wending Electromechanical Co., Ltd., Wenzhou (CN)

( * ) Notice: Subject to any disclaimer, the term of this patent is extended or adjusted under 35 U.S.C. 154(b) by 150 days.

(21) Appl. No.: 18/535,567

(22) Filed: Dec. 11, 2023

(65) Prior Publication Data
US 2025/0149870 A1   May 8, 2025

(30) Foreign Application Priority Data

Nov. 7, 2023   (CN) .......................... 202322993460.6

(51) Int. Cl.
  *H02G 1/12*   (2006.01)
(52) U.S. Cl.
  CPC ........... *H02G 1/1256* (2013.01); *H02G 1/126* (2013.01); *H02G 1/1265* (2013.01)
(58) Field of Classification Search
  CPC .. H02G 1/1251; H02G 1/1253; H02G 1/1256; H02G 1/126; H02G 1/1265; H02G 1/127
  USPC ........................... 81/9.41, 9.42, 9.51; 83/407
  See application file for complete search history.

(56) References Cited

U.S. PATENT DOCUMENTS

| | | | | |
|---|---|---|---|---|
| 2,434,640 | A * | 1/1948 | Burdwood | H01B 15/006 83/425.3 |
| 2,647,309 | A * | 8/1953 | Chisena | H02G 1/1217 30/90.9 |
| 3,951,727 | A * | 4/1976 | Greenberg | B65H 41/00 451/538 |
| 4,339,967 | A * | 7/1982 | Greenberg | H01B 15/005 81/9.51 |
| 4,753,001 | A * | 6/1988 | Alexander | H01B 15/005 81/9.51 |
| 5,107,735 | A * | 4/1992 | Ramun | H01B 15/006 83/947 |
| 8,839,695 | B2 * | 9/2014 | Newman | H02G 1/126 81/9.51 |
| 10,243,333 | B2 * | 3/2019 | Zhang | H02G 1/126 |
| 12,095,241 | B1 * | 9/2024 | Chen | H02G 1/126 |
| 2022/0393446 | A1 * | 12/2022 | Whipple | H02G 1/126 |

* cited by examiner

*Primary Examiner* — David J Parsley
(74) *Attorney, Agent, or Firm* — Westbridge IP LLC

(57) ABSTRACT

A wire stripping machine includes a supporting frame; the supporting frame is provided with a first driving shaft and a second driving shaft; the distance between the first driving shaft and the second driving shaft enables a cable to pass through; the first driving shaft is provided with a number of straightening rings; a spacing between the straightening rings is not consistent; a wire inlet groove with a width and a non-uniform depth is arranged between the straightening rings; the second driving shaft sleeve is provided with a number of cutter and is arranged in the wire inlet groove and keeps the spacing of the cutting cable insulating layers from the wire inlet groove; a limiting ring is arranged between the cutter; and a lead plate is arranged on the supporting frame.

3 Claims, 4 Drawing Sheets

HIGHLY EFFICIENT WIRE STRIPPING MACHINE

CROSS-REFERENCE TO RELATED APPLICATIONS

This application claims priority to Chinese Patent Application No. 202322993460.6, filed on Nov. 7, 2023, the content of which is incorporated herein by reference in its entirety.

TECHNICAL FIELD

The present disclosure relates to the technical field of wire stripping equipment, in particular to a wire stripping machine.

BACKGROUND

The wire stripping machine is a machine for peeling off an outer wrapped plastic sheath and a metal core. Due to the fact that the material and composition of the line diameter and the line are different, different suitable types: short line type, large square type, line type, sheath line, coaxial line type computer stripping machine and wire stripping machine are the most widely used machines in the machine industry, people rely on various mechanical automation in many places, and the wire stripping machine is the most helpful machine for helping people to produce.

According to Chinese Patent Publication CN219576487U, according to the specification, two mounting plates are provided with a first sliding grooves on opposite sides, first limiting blocks are arranged on both sides of a sliding block, the two first limiting blocks are slidably arranged in the first sliding grooves, a horizontal plate is in threaded connection with a first screw rod arranged vertically, the lower end of the first screw rod is threaded through the horizontal plate and fixedly connected with the sliding block, the height position of the sliding block is conveniently adjusted by rotating the first screw rod, and then a position of the cutter is adjusted.

The two mounting plates are provided with a second sliding groove on one side opposite to each other, two sides of a lead plate are both provided with a second limiting block, the two second limiting blocks are respectively arranged in a two second sliding grooves, the mounting plate is provided with a second opening slit communicating with the second sliding groove, the second limiting block is in threaded connection with a second screw, one end of the second screw away from the second limiting block passes through the second opening slit and is connected with an adjusting cap, the lead plate is convenient to adjust according to cables of different sizes by sliding the lead plate up and down, and the lead plate is fixed through a adjusting cap, so that the cable passes through the plurality of wire holes on the lead plate, and the cable is straightened.

The sliding block is adjusted by rotating the first screw rod according to the thickness of the cable, so that the position of a cutter is adjusted, the height of the lead plate is adjusted through the adjusting cap, so that a wire hole is matched with the distance between the cutter and a hemisphere block, so that the cable is sheared; However, there are disadvantages of cumbersome adjustment, long adjustment time and inconvenience, and only a single cable can be cut insulation layer, resulting in low efficiency.

SUMMARY

A wire stripping machine is provided, which includes a supporting frame, the supporting frame is provided with a first driving shaft and a second driving shaft; a distance between the first driving shaft and a second driving shaft enables a cable to pass through; the first driving shaft is provided with a number of straightening rings; a spacing between a straightening rings is not consistent; a wire inlet groove with a non-uniform width and a non-uniform depth is arranged between the straightening rings; the second driving shaft sleeve is provided with a number of cutter and is arranged in the wire inlet groove and keeps the spacing of the cutting cable insulating layers from the wire inlet groove; a limiting ring is arranged between the cutter; the supporting frame is provided with a lead plate; the lead plate is provided with a number of wire holes with inconsistent sizes; and the lead plate is arranged at the inlet of the wire inlet groove.

The supporting frame is provided with a baffle plate, the baffle plate is provided with a sawtooth block and is arranged at an outlet of the wire inlet slot, the bottom of the supporting frame is provided with a base plate, the base plate is provided with a residue port and is arranged below the wire inlet slot, and two sides above the supporting frame are provided with a splash plate.

Two sides of a second driving shaft are provided with a fixing frame and are connected and fixed with the side wall of the supporting frame, the fixing frame is provided with a first guiding ring and is arranged on two sides of the second driving shaft, the fixing frame is provided with a through hole, the second driving shaft is provided with an external thread groove, the external thread groove is provided with a fixing ring and abuts against the end surface of a cutter, the fixing ring is provided with an internal thread groove and is in fit connection with the external thread groove.

Two sides of the top of the supporting frame are provided with a fixing block, the fixing block is provided with a threaded hole, the threaded hole is provided with a rotating nut and passes through the through hole and abuts against a first guiding ring, so that a first guiding ring is fixed at a current position, and the top of the fixing block is provided with a cover plate.

Two sides of the first drive shaft are provided with a second guiding ring and are fixedly connected with the side wall of the supporting frame, and the first drive shaft is provided with a connecting column and passes through the second guiding ring and the side wall of the supporting frame.

According to the cable cutting machine, a number of cables with different diameters enter the whole straight ring through the wire holes and are placed on the wire inlet groove in a positive position, and the width and the depth do not conform to the wire inlet groove, so that a spacing between the cutter and the wire inlet groove is not consistent, so that the cutting machine can cut a cable insulating layer with different diameters at the same time, the cutting efficiency is improved, the cable can also be suitable for cables with different diameters, the adjustment is not needed, the operation difficulty is reduced, the problems of the background technical scheme are overcome, and the product has the advantages of multiple cable cutting and high working efficiency.

DETAILED DESCRIPTION OF THE EMBODIMENTS

Figure 1:
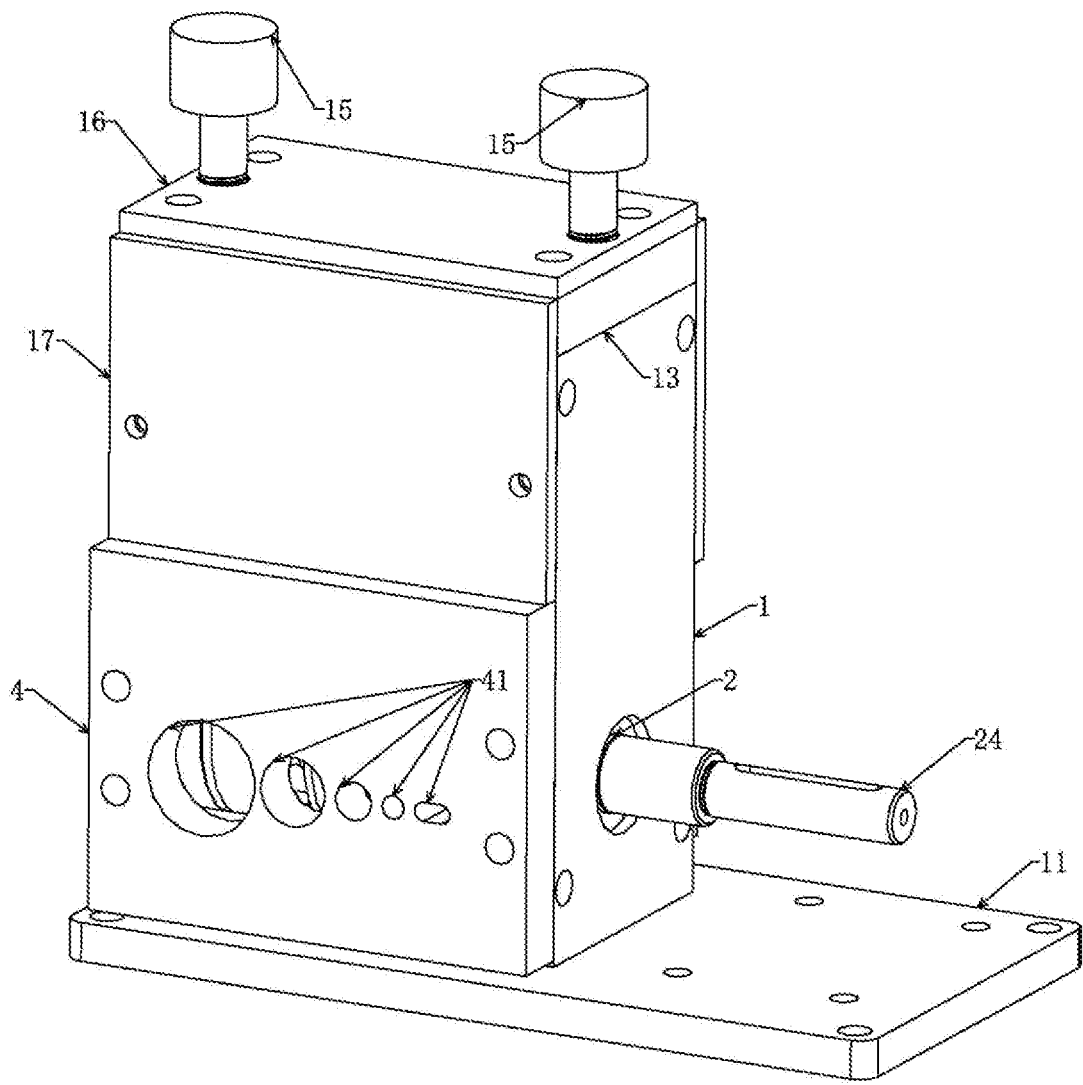
FIG. 1 is a schematic structural diagram of a wire stripping machine according to some embodiments.

The technical solutions of the present disclosure will be clearly and completely described below with reference to the embodiments, and it is obvious that the described embodiments are part of the embodiments of the present disclosure, not all embodiments. All other embodiments obtained by those of ordinary skill in the art without creative efforts shall fall within the scope of the present disclosure.

In the description of the present disclosure, it should be understood that the orientation or positional relationship indicated by "upper", "lower", "left", "right" and the like in the terms is based on the orientation or positional relationship shown in the drawings, only for convenience of describing the present disclosure and simplifying the description, rather than indicating or implying that the device or element referred to have a specific orientation and is configured and operated in a specific orientation, and therefore cannot be understood as a limitation on the present disclosure.

Figure 2:
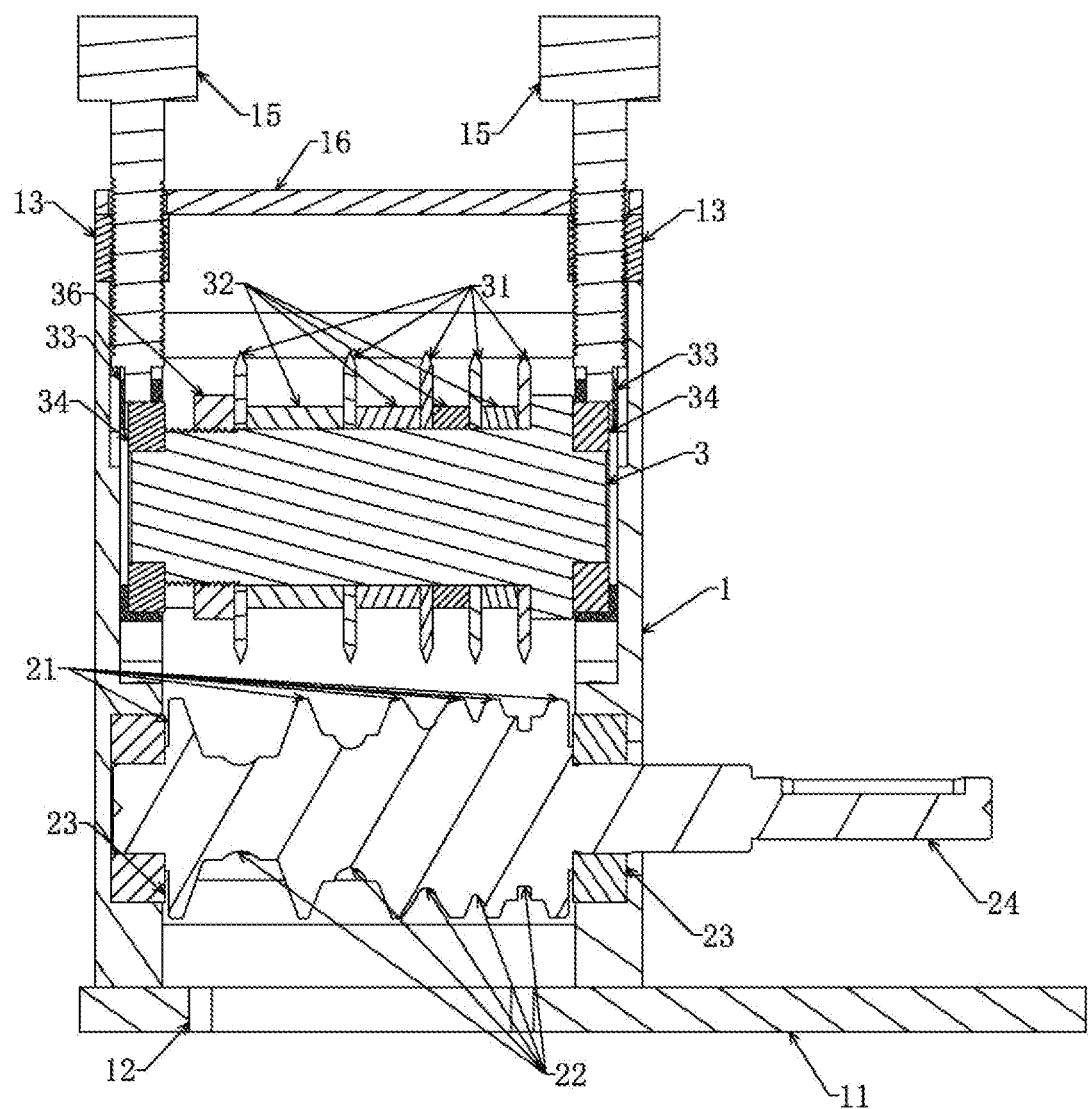
FIG. 2 is a side cross-sectional structural diagram of a wire stripping machine according to some embodiments.
Figure 3:
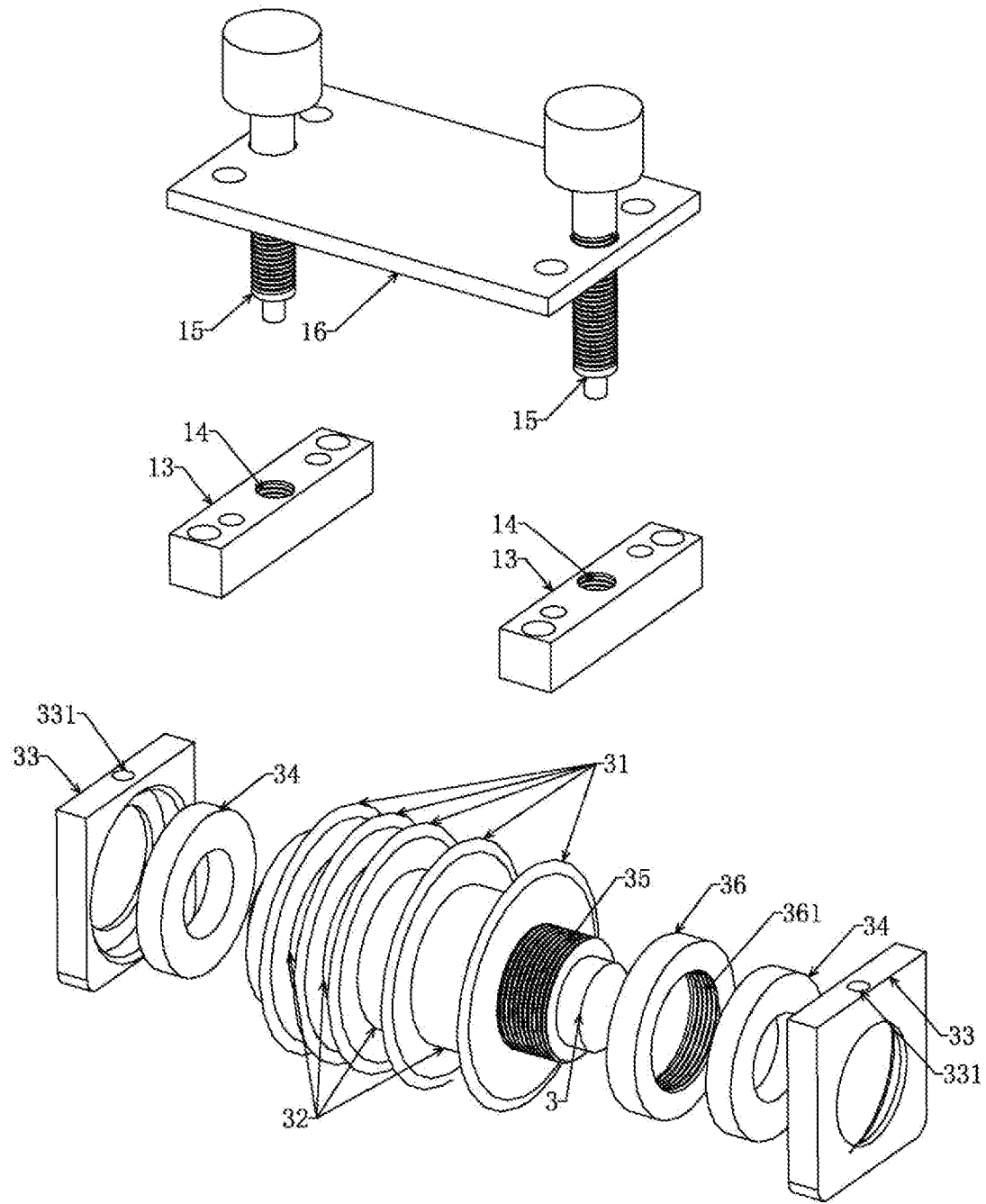
FIG. 3 is an exploded view of a wire stripping machine according to some embodiments.
Figure 4:
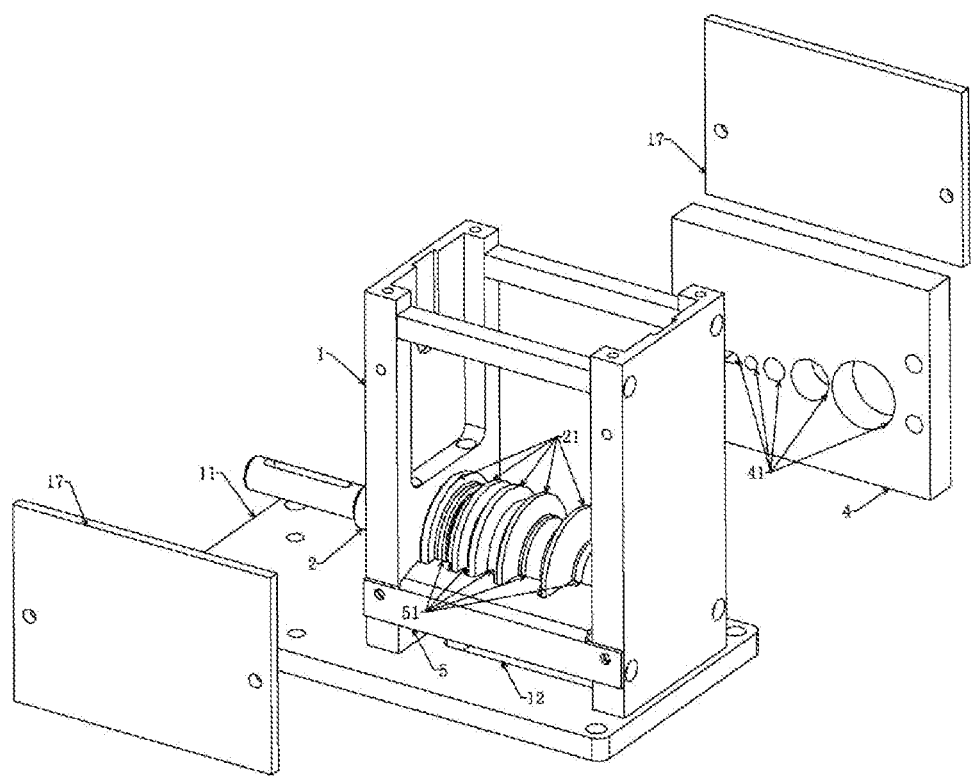
FIG. 4 is another exploded view of a wire stripping machine according to some embodiments.

Referring to FIGS. 1 to 4, a wire stripping machine includes a supporting frame 1, the supporting frame 1 is provided with a first driving shaft 2 and a second driving shaft 3, a spacing between the first driving shaft 2 and the second driving shaft 3 for passing a cable is reserved, the first driving shaft 2 is provided with a number of straightening rings 21, and a spacing between the straightening rings 21 is not consistent; a wire inlet groove 22 with a non-uniform width and a non-uniform depth is arranged between the straightening rings 21; a number of cutter 31 are arranged on the second driving shaft 3 in a sleeving manner and are arranged in the wire inlet grooves 22, and the spacing of the cutting cable insulating layers is maintained with the wire inlet grooves 22; a limiting ring 32 is arranged between the cutter 31; the supporting frame 1 is provided with a lead plate 4; the lead plate 4 is provided with a number of wire holes 41 with inconsistent sizes and is arranged at the inlet of the wire inlet groove 22.

It is worth mentioning that the supporting frame 1 is provided with a baffle plate 5, the baffle plate 5 is provided with a sawtooth block 51 and is arranged at the outlet of the wire inlet groove 22, the bottom of the supporting frame 1 is provided with a base plate 11, the base plate 11 is provided with a residue port 12 and is arranged below the wire inlet groove 22, two sides above the supporting frame 1 are provided with a splash-proof plate 17, the baffle plate 5 prevents the cutter 31 from splashing out of the residue of different sizes when cutting the insulation layer, so that the residue enters the residue port 12, the sawtooth block 51 culls the residue left on the wire inlet groove 22, the depth of the wire inlet groove 22 is prevented from increasing, the insulation layer of the cable is excessively cut by the cutter 31, the base plate 11 plays a role in connection and fixation with the object, and the splash-proof plate 17 prevents residue in the cutting process from splashing out.

It is worth mentioning that two sides of the second driving shaft 3 are provided with a fixing frame 33 and are connected and fixed with the side wall of the supporting frame 1, the fixing frame 33 is provided with a first guiding ring 34 and is arranged on two sides of the second driving shaft 3, the fixing frame 33 is provided with a through hole 331, the second driving shaft 3 is provided with an external thread groove 35, the external thread groove 35 is provided with a fixing ring 36 and abuts against the end surface of the cutter 31 at the tail end, the fixing ring 36 is provided with an internal thread groove 361 and is in fit connection with the external thread groove 35, the fixing frame 33 plays a role of supporting the second driving shaft 3, the first guiding ring 34 enables the second driving shaft 3 to rotate in the axial line direction, the through hole 331 is matched with a rotary nut 15, the external thread groove 35 is matched with the internal thread groove 361, the rotary fixing ring 36 enables the plurality of cutter 31 to closely fit with the limiting ring 32, the cutter 31 is ensured to be fixed at the current position, and meanwhile, the cutter 31 is convenient to replace.

It is worth mentioning that a fixing block 13 is arranged on both sides of the top of the supporting frame 1, a threaded hole 14 is formed in the fixing block 13, the rotating nut 15 is arranged in the threaded hole 14, passes through the through hole 331 and abuts against the first guiding ring 34, so that the first guiding ring 34 is fixed at the current position, a cover plate 16 is arranged at the top of the fixing block 13, the threaded hole 14 is matched with the rotating nut 15, the rotating nut 15 is tightened, the first guiding ring 34 is fixed at the current position, the upper and lower bumping is generated when the cutter 31 cuts the cable insulating layer, partial insulating layers are not cut, the cover plate 16 prevents dust from entering, and meanwhile, splashing residues are prevented from flying out.

It is worth mentioning that a second guiding ring 23 is disposed on both sides of the first drive shaft 2 and is connected to the side wall of the supporting frame 1, the first drive shaft 2 is provided with a connecting column 24, and passes through the second guiding ring 23 and the side wall of the supporting frame 1, the second guiding ring 23 rotates the first drive shaft 2 in the axial line direction, and the connecting column 24 facilitates connection and fixation with the motor.

The principle of use of the present disclosure is described as follows.

The motor is started to drive the first driving shaft 2 to rotate, cable with the varying diameter is put into the wire hole 41, the cable enters the wire wheel, the whole straight plate provides a guiding effect for the bent cable until the cable enters the wire wheel, when the cable passes through the spacing between the wire wheel and the cutter 31, the cutter 31 cuts the insulating layer of the cable, and rotates the second driving shaft 3 along with the cut cable, so that the cutter 31 at different positions is replaced, the situation that the position of the cutter 31 is too much abraded is avoided, residues in the cutting process enter the waste container through the residue port 12, and the insulating layer of the bulk cutting layer is brought out along with the cut cable.

According to the design, the cable can be cut and the machine working efficiency is high.

The above contents are described in further detail with reference to specific embodiments, and the practical implementation of the present disclosure is not limited to these descriptions, and for those of ordinary skill in the technical field of the present disclosure, several simple deduction or substitutions may be made without departing from the concept of the present disclosure, and should be regarded as the protection scope determined by the claims filed in the present disclosure.

What is claimed is:

1. A wire stripping machine, comprising a supporting frame, wherein the supporting frame is provided with a first driving shaft and a second driving shaft, and a spacing between the first driving shaft and the second driving shaft for passing a cable is reserved; the first driving shaft is provided with a plurality of straightening rings, and a spacing between the straightening rings is not consistent; a wire inlet groove with a width and a non-uniform depth is arranged between the straightening rings; the second driving shaft is sleeved with a plurality of cutters and is arranged in the wire inlet groove, and a spacing between cutting cable insulating layers is maintained with the wire inlet groove; a limiting ring is arranged between the cutters; the supporting frame is provided with a lead plate; the lead plate is provided with a plurality of wire holes with inconsistent sizes, and is arranged at an inlet of the wire inlet groove;

the supporting frame is provided with a baffle plate, the baffle plate is provided with a sawtooth block and is arranged at an outlet of the wire inlet groove, a base plate is arranged at a bottom of the supporting frame, a residue port is arranged on the base plate and arranged below the wire inlet groove, and splash plates are arranged on two sides of an upper portion of the supporting frame; and two sides of the second driving shaft are provided with a fixing frame and are connected and fixed with a side wall of the supporting frame, the fixing frame is provided with a first guiding ring and is arranged on two sides of the second driving shaft, the fixing frame is provided with a through hole, the second driving shaft is provided with an external thread groove, the external thread groove is provided with a fixing ring and abuts against an end surface of a cutter of the plurality of cutters at the tail end, the fixing ring is provided with an internal thread groove and is in fit connection with the external thread groove.

2. The wire stripping machine according to claim 1, wherein fixing blocks are arranged on top of both sides of the supporting frame, the fixing block is provided with a threaded hole, the threaded hole is provided with a rotating nut, the rotating nut passes through the through hole and abuts against the first guiding ring, so that the first guiding ring is fixed at a current position, and a top of the fixing block is provided with a cover plate.

3. The wire stripping machine according to claim 2, wherein two sides of the first drive shaft are provided with a second guiding ring and are fixedly connected with the side wall of the supporting frame, the first drive shaft is provided with a connecting column and passes through the second guiding ring and the side wall of the supporting frame.

* * * * *